US007643285B2

(12) United States Patent
Nishiyama et al.

(10) Patent No.: US 7,643,285 B2
(45) Date of Patent: Jan. 5, 2010

(54) STORAGE APPARATUS

(75) Inventors: Shinichi Nishiyama, Ninomiya (JP);
Kenichi Miyamoto, Odawara (JP);
Shigeaki Tanaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 301 days.

(21) Appl. No.: 11/543,129

(22) Filed: Oct. 5, 2006

(65) Prior Publication Data
US 2008/0043426 A1 Feb. 21, 2008

(30) Foreign Application Priority Data
Aug. 18, 2006 (JP) ............................. 2006-223505

(51) Int. Cl.
*H05K 5/00* (2006.01)
*H05K 7/20* (2006.01)
*G06F 1/20* (2006.01)
(52) U.S. Cl. ............... 361/679.49; 361/695; 361/679.5; 361/724; 361/679.48; 454/184
(58) Field of Classification Search ................. 361/687, 361/679.48–679.5, 695, 724; 454/184
See application file for complete search history.

(56) References Cited

U.S. PATENT DOCUMENTS

| 4,648,007 | A | * | 3/1987 | Garner ........................ 361/695 |
| 4,774,631 | A | * | 9/1988 | Okuyama et al. ........... 361/695 |
| 4,911,231 | A | * | 3/1990 | Horne et al. ........... 165/104.34 |
| 5,136,464 | A | * | 8/1992 | Ohmori ....................... 361/694 |
| 5,544,012 | A | * | 8/1996 | Koike .......................... 361/695 |
| 5,559,673 | A | * | 9/1996 | Gagnon et al. .............. 361/695 |
| 5,570,740 | A | * | 11/1996 | Flores et al. ........... 165/104.34 |
| 5,832,988 | A | * | 11/1998 | Mistry et al. ................ 165/103 |
| 6,000,623 | A | * | 12/1999 | Blatti et al. ................. 236/49.3 |

(Continued)

FOREIGN PATENT DOCUMENTS

JP        08-273345 A       3/1995

(Continued)

OTHER PUBLICATIONS

U.S. Appl. No. 11/437,693, filed May 22, 2006, Miyamoto et al.

*Primary Examiner*—Jayprakash N Gandhi
*Assistant Examiner*—Bradley H Thomas
(74) *Attorney, Agent, or Firm*—Stites & Harbison PLLC; Juan Carlos A. Marquez, Esq.

(57) ABSTRACT

A storage apparatus has a cabinet stored with an array of memory mediums, a power supply unit housed at the bottom of the cabinet, a fan provided immediately under the top surface of the cabinet and immediately above the memory mediums, and a partition member provided insides the cabinet and configured to partition a first cooling path from mixing with a second cooling path inside the cabinet. The first cooling path of first external air for cooling the memory mediums starts at an inlet on a side surface of the cabinet and ends at the top surface of the cabinet to discharge the first external air out of the cabinet form the top surface. The second cooling path of second external air for cooling the power supply unit ends at the top surface of the cabinet and discharges the second external air out of the cabinet at the top surface.

12 Claims, 9 Drawing Sheets

U.S. PATENT DOCUMENTS

| | | | | |
|---|---|---|---|---|
| 6,061,237 A * | 5/2000 | Sands et al. | | 361/695 |
| 6,104,608 A * | 8/2000 | Casinelli et al. | | 361/692 |
| 6,119,768 A * | 9/2000 | Dreier et al. | | 165/104.33 |
| 6,157,534 A * | 12/2000 | Gallagher et al. | | 361/683 |
| 6,280,318 B1 * | 8/2001 | Criss-Puszkiewicz et al. | | 454/184 |
| 6,567,267 B1 * | 5/2003 | Wang | | 361/695 |
| 6,598,668 B1 * | 7/2003 | Cosley et al. | | 165/104.32 |
| 6,678,156 B2 * | 1/2004 | Moizer | | 361/690 |
| 6,693,796 B2 * | 2/2004 | Ives et al. | | 361/685 |
| 6,704,198 B2 * | 3/2004 | Replogle et al. | | 361/690 |
| 6,876,549 B2 * | 4/2005 | Beitelmal et al. | | 361/692 |
| 6,877,551 B2 * | 4/2005 | Stoller | | 165/47 |
| 6,889,752 B2 * | 5/2005 | Stoller | | 165/47 |
| 6,987,673 B1 * | 1/2006 | French et al. | | 361/727 |
| 7,046,513 B2 * | 5/2006 | Nishiyama et al. | | 361/695 |
| 7,154,748 B2 * | 12/2006 | Yamada | | 361/690 |
| 7,187,547 B1 * | 3/2007 | French et al. | | 361/679.33 |
| 7,209,351 B2 * | 4/2007 | Wei | | 361/695 |
| 7,254,022 B2 * | 8/2007 | Ebermann | | 361/696 |
| 7,360,660 B2 * | 4/2008 | Tsuzuki | | 211/41.17 |
| 7,382,613 B2 * | 6/2008 | Vinson et al. | | 361/679.48 |
| 2002/0141156 A1 * | 10/2002 | Edmunds et al. | | 361/694 |
| 2004/0100770 A1 * | 5/2004 | Chu et al. | | 361/698 |
| 2004/0184233 A1 * | 9/2004 | Yamada | | 361/690 |
| 2005/0280986 A1 * | 12/2005 | Coglitore et al. | | 361/687 |
| 2006/0044758 A1 * | 3/2006 | Spangberg | | 361/695 |
| 2006/0056142 A1 * | 3/2006 | Takahashi et al. | | 361/683 |
| 2007/0223201 A1 * | 9/2007 | Fujiya et al. | | 361/727 |

FOREIGN PATENT DOCUMENTS

JP    2006-083445    9/2004

* cited by examiner

STORAGE APPARATUS

CROSS-REFERENCES TO RELATED APPLICATIONS

This application relates to and claims priority from Japanese Patent Application No. 2006-223505, filed on Aug. 18, 2006, the entire disclosure of which is incorporated herein by reference.

BACKGROUND

The present invention generally relates to a high-density mounting storage apparatus housing numerous memory mediums in a cabinet, and in particular relates to a storage apparatus having a configuration for improving the cooling capability in the cabinet.

Generally speaking, a portion of the power supplied to a hard disk drive in an electronic apparatus is converted into frictional heat caused by the rotation of the hard disk or resistance heat of an electronic circuit. With a storage apparatus having a plurality of hard disk drives arranged in an array, the denser these hard disk drives are mounted, the higher the heating value. Thus, while the storage apparatus is being operated, it is necessary to cool the hard disk drives and electronic circuits in the storage apparatus.

In recent years, as represented by a large storage apparatus configured with a RAID (Redundant Array of Independent Disks) system, for instance, the storage capacity of storage apparatuses is of an increasing trend. In other words, the number of hard disk drives mounted on the storage apparatus is increasing, which means that the mounting density of the hard disk drives is increasing.

As a result of this high-density mounting, the power consumption and heating value of storage apparatuses are ever increasing. As a measure against such heat generation, although a fan for introducing external air into the storage apparatus is being enlarged, resistance against the circulation of external air in the storage apparatus is significant due to the high-density mounting of the hard disk drives, and an effect of sufficiently cooling the inside of the storage apparatus has not yet been achieved. Thus, there is no choice but to enlarge the fan even further, which results in distracting noise caused by the fan, and the electricity consumption for operating the fan will also increase.

Conventionally, as a magnetic disk device having this kind of cooling system, as described in Japanese Patent Laid-Open Publication No. H8-273345, proposed is a magnetic disk device configured by including in a single apparatus cabinet a plurality of magnetic disk drives for magnetically storing information, a control circuit board mounted with a control circuit for controlling such magnetic disk drives, and a ventilation means for cooling the magnetic disk drives and control circuit board with air cooling, wherein the magnetic disk drives, control circuit board and ventilation means are retained in a frame to configure a single disk box, and a plurality of such disk boxes are housed in a single apparatus cabinet.

Further, Japanese Patent Application No. 2006-83445 introduces a storage apparatus comprising a plurality of cooling areas, an external air introduction/exhaust device for guiding external air to the respective cooling areas and subsequently discharging the external air from the exhaust area of the cabinet to the outside of the cabinet, and an external air guidance area for guiding the external air that passed through the respective cooling areas to the exhaust area. The external air guidance area is configured so that the external air that passed through one cooling area will not get mixed with the external air that passed through another cooling area.

SUMMARY

Nevertheless, although Japanese Patent Laid-Open Publication No. H8-273345 proposes providing a ventilation means to each disk box for cooling each disk unit, no consideration is given to streamlining the exhaust air or miniaturizing the fan.

Further, Japanese Patent Application No. 2006-83445 proposes providing a plurality of cooling areas to the storage apparatus, configuring the external air guidance area so that the external air that passed through one cooling area will not get mixed with the external air that passed through another cooling area, and installing the fan for cooling the storage apparatus at the upper part of the storage apparatus so as to reduce the external air to be discharged. It is thereby possible to suppress the noise caused by the fan and the electrical consumption required for the cooling.

Nevertheless, the high-density mounting of storage apparatuses has advanced, and the opening space of the cooling path provided between the hard disk boxes mounted on the storage apparatus is becoming narrow. As a result, there is a so-called dead space where the fans installed at the upper part of the cabinet of the storage apparatus cannot face the cooling path, and no consideration was given to the fact that only a portion of the exhaust air volume of the fans could be utilized and the cooling efficiency consequently deteriorated. Further, since a storage apparatus is subject to high-density mounting where apparatuses are mounted on the front and back faces, exhaust air is primarily discharged from the top face of the storage apparatus. The fans installed at the upper face of the storage apparatus for discharging exhaust air generated reflected sound as a result of the noises generated from the fans being reflected off the ceiling since there are no obstacles between the fans and the ceiling. Nevertheless, no consideration was given in inhibiting the reflected sound without interfering with the exhaust air.

The present invention was made in view of the foregoing problems. Thus, an object of the present invention is to retain the cooling efficiency of fans even in a high-density mounting storage apparatus, and in particular to inhibit the reflected sound from the ceiling among the noises generated from the fans upon cooling the storage apparatus.

In order to achieve the foregoing object, the present invention provides a storage apparatus having a cabinet for storing a plurality of memory mediums in an array, and a power supply unit for supplying power to a drive circuit of the memory mediums. The power supply unit is housed inside the ground plane side of the cabinet, and the plurality of memory mediums are housed inside the cabinet on the power supply unit. This storage apparatus includes a first cooling path to become a passage inside the cabinet of first external air for cooling the plurality of memory mediums, and which ends at an upper end portion of the cabinet, a second cooling path to become a passage inside the cabinet of second external air for cooling the power supply unit, and which ends at the upper end portion of the cabinet, a fan provided to the upper end portion of the cabinet so as to face the memory mediums positioned immediately below from the end of the first cooling path, and for drawing in the first external air to the first cooling path and discharging the first external air that cooled the plurality of memory mediums outside the cabinet, and a partition member for partitioning the first cooling path and the second cooling path so that the first external air and the second external air do not get mixed. The fan is supported by the cabinet so as to be slanted against a peripheral part of the memory mediums positioned immediately below the first cooling path. Also provided is a storage apparatus wherein a duct for covering the fan is provided to the upper end portion of the cabinet, and the duct is configured so as to cushion the operational noise generated from the fan.

According to the present invention, it is possible to retain the cooling efficiency of fans even in a high-density mounting storage apparatus, and in particular to inhibit the reflected sound from the ceiling among the noises generated from the fans upon cooling the storage apparatus.

DETAILED DESCRIPTION

Figure 1:
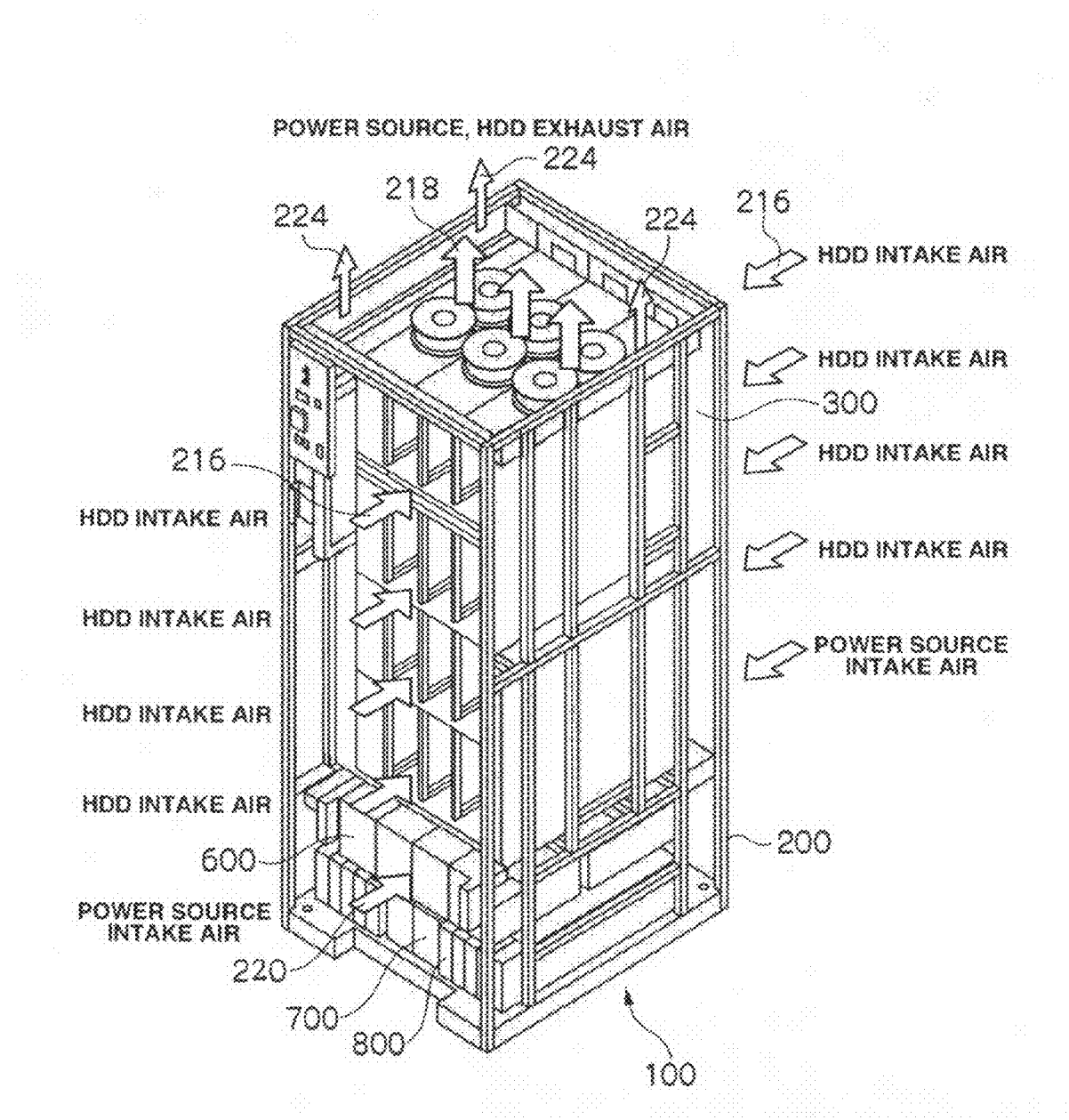
FIG. 1 is a perspective view showing the overall storage apparatus.

Embodiments of the present invention are now explained with reference to the attached drawings. FIG. 1 is a perspective view showing the overall storage apparatus. As shown in FIG. 1, the storage apparatus 100 is configured by housing, in a cabinet 200 forming a large rectangular shape, a DC power supply 600, a battery 800, and an HDD (hard disk) box 300 from the ground plane side of the cabinet toward the top side of the cabinet in that order. The storage apparatus is controlled by a disk controller not shown connected to the storage apparatus.

An upper-level system not shown (a host system for example) is connected to the storage apparatus illustrated in FIG. 1, and data to be accessed by the host system is stored in the hard disk drives in the HDD box 300. Each HDD box 300 has a plurality of hard disk drives 300A arranged in an array.

Figure 2:
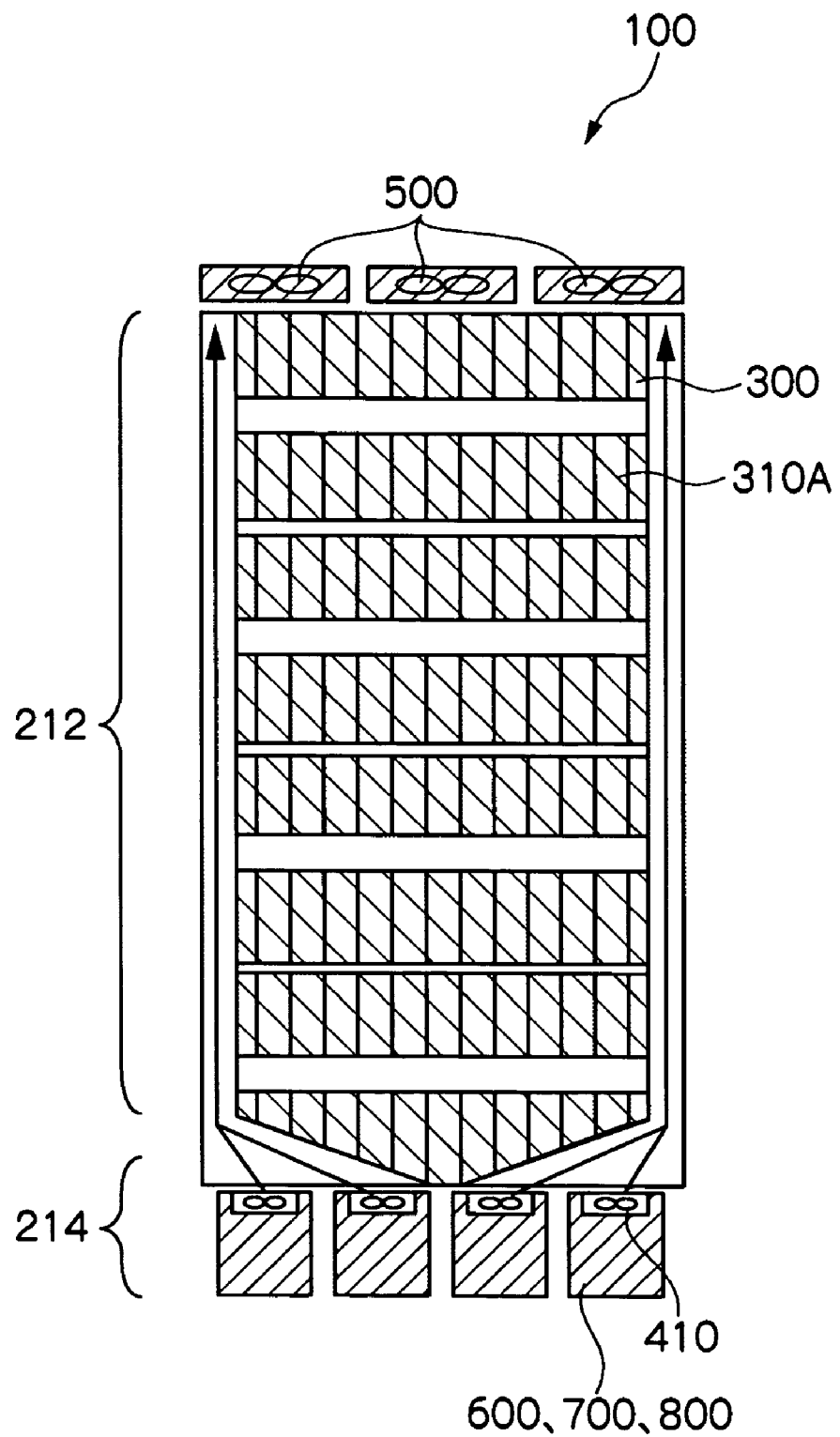
FIG. 2 is a diagram showing a state where the respective units are housed in a cabinet 200 of the storage apparatus 100, and the direction of the wind flowing in the respective units.

FIG. 2 is a diagram showing a state where the respective units are housed in the cabinet 200 of the storage apparatus 100, and the direction of the wind flowing in the respective units. Foremost, the foregoing HDD box 300 is housed in the upper row of the storage apparatus 100. The hard disk drive 300A in the HDD box 300 is insertably and removably housed in the HDD box 300. Electric fans 500 are provided at the top face of the storage apparatus 100. These fans 500 guide the external air from outside the cabinet toward the center of the cabinet via the HDD box 300, and discharge this external air from the top of the storage apparatus 100.

A total of 128 disk drives 310A are loaded in an array in the HDD box 300; namely, 8 rows in the direction of gravitational force, and 16 rows in a direction perpendicular to the vertical direction. Incidentally, a plurality of frames are assembled to form a rectangular shape so as to configure the overall cabinet 200. The HDD box 300 is supported by the upper part of the cabinet. Further, the DC power supply 600, the battery 800 and the AC box 700 are housed in the lower row of the cabinet.

The battery 800, the AC box 700 and the DC power supply 600 are housed inside the lower row of the cabinet 200 as described above, and integrally form the power supply unit 410A of the storage apparatus. By disposing the heavy power supply unit 410A in the lower row of the storage apparatus 100, it is possible to stabilize the storage apparatus 100 upon grounding the storage apparatus 100. Electric fans 410 are provided at the upper end face of the power supply unit 410A for drawing in the external air from outside the cabinet 200 into the cabinet. These electric fans 410 guide the external air into the cabinet via the power supply unit 410A, and discharge such external air outside the cabinet 200.

The DC power supply 600 converts AC power into DC power, and supplies DC power to the disk drive 310A. The battery 800 supplies backup power to the respective components inside the storage apparatus 100 during a blackout or failure in the DC power supply 600. The AC box 700 is an intake of AC power to the storage apparatus 100, and functions as a breaker. AC power introduced into the AC box 700 is supplied to the DC power supply 600. The heating value generated by the power supply unit 410A is cooled by the external air supplied into the cabinet with the electric fans 410.

The direction of wind flowing through the respective units is now explained with reference to FIG. 1 and FIG. 2. The cooling area of the storage apparatus 100 is broadly separated into two sections; that is, the cooling area is configured from a path 212 for cooling the HDD box 300, and a path 214 for cooling the power supply unit 410A. The electric fans 500 aspirate the external air 216 from the outside to inside of the cabinet via the HDD box 300. This external air is discharged outside the storage apparatus 100 as exhaust air 218 by the electric fans 500. The external air 216 passes through the vicinity of the hard disk drives while flowing from the outside to inside of the cabinet so as to cool the hard disk drives.

The electric fans 410 explained with reference to FIG. 2 aspirate the external air 220 from the outside to inside of the cabinet 200 via the power supply unit 410A, and this external air rises in the cabinet 200, passes through a cooling path 210D provided on the side face of a partition member 210 described later to be installed between the HDD boxes 300, and is discharged outside the cabinet 200 as exhaust air 224 from the side face of the HDD box 300. The cooling path for the external air being introduced as intake air 216 and thereafter discharged outside the cabinet as exhaust air 218, and the cooling path for the external air being introduced as intake air 220 and thereafter discharged outside the cabinet as exhaust air 224 are formed so that the external air of the former and external air of the latter do not get mixed. In other words, it is possible to substantially avoid the external air 220 from becoming the external air for cooling the HDD boxes. Incidentally, in FIG. 1 and FIG. 2, the external air is aspirated inside the storage apparatus 100 from the front face and back face of the storage apparatus 100.

Figure 3:
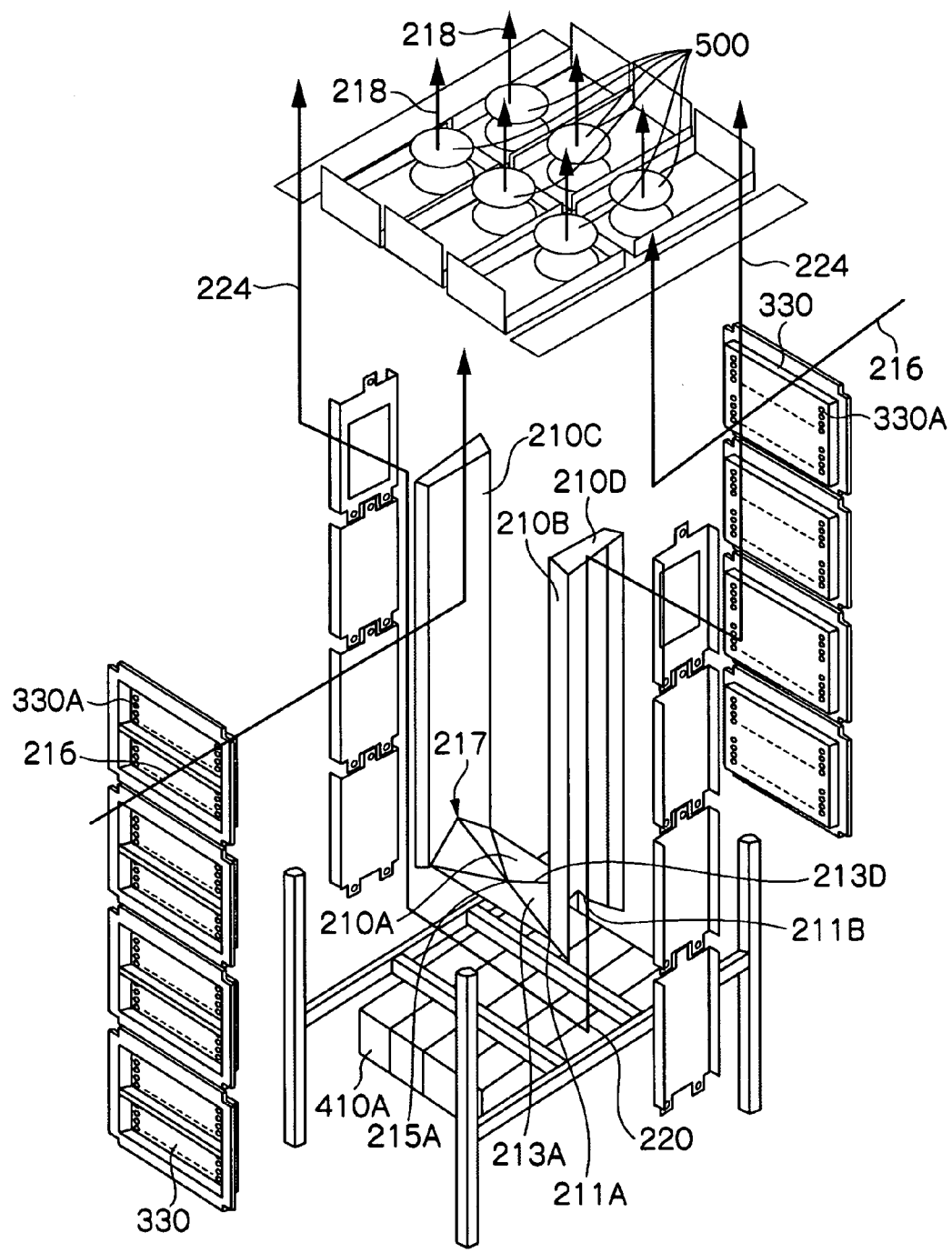
FIG. 3 is a diagram showing the configuration of the storage apparatus.

FIG. 3 is a perspective view showing this configuration. Although not shown in FIG. 3, a pair of HDD boxes 300 is housed inside the storage apparatus 100 respectively from the front side and back side of the storage apparatus 100. Provided between the pair of HDD boxes 300 is a partition member 210 for substantially differentiating the introduction route of the intake air 220 passing through the cabinet as shown in FIG. 3 from the introduction route of the external air 216 passing through the cabinet. As a result of this partition member 210, the introduction route of external air in the cabinet will be as shown in FIG. 3. Although this partially overlaps with the explanation of FIG. 1 and FIG. 2, the intake air 216 enters the partition member 210 through the openings 330A provided to a resistive plate 330 described later from the front face and back face of the HDD box 300, and is discharged outside the cabinet as exhaust air 218 with the fans 500 at the upper part of the storage apparatus. In FIG. 3, the external air 200 aspirated from the periphery of the lower row of the cabinet 200, without passing through the inside of the HDD box 300, passes through the external air path 210D provided to the side face of the partition member 210, and is discharged outside the storage apparatus 100 as exhaust air 224.

The structure of the partition member 210 is now explained in detail. The partition member 210 is formed in a rectangular shape where the planar surface and inside are opened. The bottom face of the partition member 210 is shielded so that the external air 220 (refer to FIG. 1) will not enter the partition member 210. An external air path 210D is provided to the left and right sides of the partition member 210, which is blocked so that air from inside the partition member 200 will not enter, so as to pass the external air 220 aspirated from the periphery of the lower row of the cabinet 200.

As shown in FIG. 3, the partition member 210 is configured by including a bottom face 210A, left and right side faces 210C, an external air path 210D provided to the left and right side faces, and a frame 210B for forming the overall structure in a rectangular shape. At the front side and back side of the partition member 210, a resistive plate 330 is fixed to the frame 210B. This resistive plate 330 is fixed so as to face the HDD box 300 not shown. A plurality of openings 330A are formed on the resistive plate 330 to allow external air to enter into the partition member 210. The number of openings is the same for all resistive plates 330, the opening space is the same, and the position of the openings is also the same.

According to this structure, since the external air discharged from the power supply unit 410A will not get mixed with the external air that passes through the inside of the HDD box 300, the air that passes through the inside of the HDD box 300 will not be influenced by the external air that is discharged from the power supply unit 410A. Since the velocity Q of the wind that passes through the openings 330A can be sought from the product of the air volume and opening area, if all areas of the openings 330A provided to the resistive plate 330 facing the HDD box 300 are made to be equal, the air volume will be fixed. Thus, the velocity Q will be equal in all openings. The reason the opening area is made equal is to make the air volume and velocity in all openings 330A constant regardless of the distance from the fans installed at the upper part of the HDD box 300. Thereby, since external air with constant velocity will consistently pass through the inside of the HDD box 300, the temperature inside the HDD box 300 can be made uniform, and the reduction of rise in temperature can be sought efficiently.

The external air 216 shown in FIG. 3 is guided into the partition member 210 while retaining constant velocity via the openings 330A, and the external air 220 rises inside the cabinet through the external air path 210D provided to the left and right side faces of the partition member 210, and not inside the partition member 210. Therefore, the partition member 210 separates the area to which the intake air 216 is guided and the area to which the intake air 220 is guided. The fans 500 merely have to be of a capacity sufficient in aspirating and discharging the intake air 216, and the fans 410 not shown in FIG. 3 merely have to be of a capacity sufficient in aspirating and discharging the intake air 220.

In other words, the partition member 210 is formed in a box shape with an open upper part, and is structured to separate the external air by providing the fans at the upper part of the partition member 210 and providing the fans 410 downward at the bottom part of the partition member 210. Therefore, the noise generated upon operating the fans can be reduced, and external air can be discharged efficiently. Incidentally, since there was no partition member 210 in the past, the intake air 220 and the intake air 216 were mixed inside the cabinet, and the mixed external air was brought together and discharged by the fans 500. Thus, this led to the enlargement of the fans 500. As a result, the power consumption and noise of the fans 500 also increased. Further, if the shaft that rotates the blades of the fans is enlarged, it will block the air passage. Thus, if the fans 500 are miniaturized, it will be possible to install the fans according to the channel area, and reduce the hissing sound generated when the fans 500 rotate.

As shown in FIG. 3, the bottom face 210A of the partition member 210 has an inclined surface 213A toward the center of the partition member 210 formed from a front face edge 211A and a back face edge 211 B of the bottom face, and an inclined surface 213B not shown at the left and right sides thereof, respectively. Moreover, from the center 215A of the bottom face 210A, formed is a ridge line 213D so as to connect the intersecting point 213C (not shown) of the inclined surfaces 213A and 213B. As a result of the inclined surfaces 213A, 213B and the ridge line 213D, a pair of semi-triangular pyramid-shaped concave portions 217 is formed from the center of the partition member 210 toward the left and right sides thereof. The external air 220 is force fed to the partition member 210 with the fans 410 provided to the upper part of the power supply unit 410A not shown in FIG. 3, hits the bottom face 210A of the partition member 210, and is then guided to the left and right side faces of the partition member 210 along the concave portion 217. The width of the concave portion gradually becomes larger toward the left and right side faces from the center of the partition member 210 since the concave portion is formed in a triangular pyramid shape. As a result, the external air 220 is guided smoothly to the left and right side faces from the center of the partition member 210. In other words, the external air 220 is guided smoothly to the left and right side faces from the center of the partition member 210 due to the pair of concave portions 217 formed from the center of the partition member 210 toward the left and right side faces thereof. More specifically, the partition member 210 has a concave portion for the exhaust air from the power supply unit 410A to flow toward a direction in which the HDD box 300 is not installed; that is, toward the side face. Further, the inclined surfaces 213A, 213B guide the external air from the front face/back face to the center of the partition member. Moreover, the external air passes through the external air path 210D provided to the side face of the partition member 210, and is then discharged from the side face of the HDD box 300. The flow of external air is shown in FIG. 3.

Figure 4:
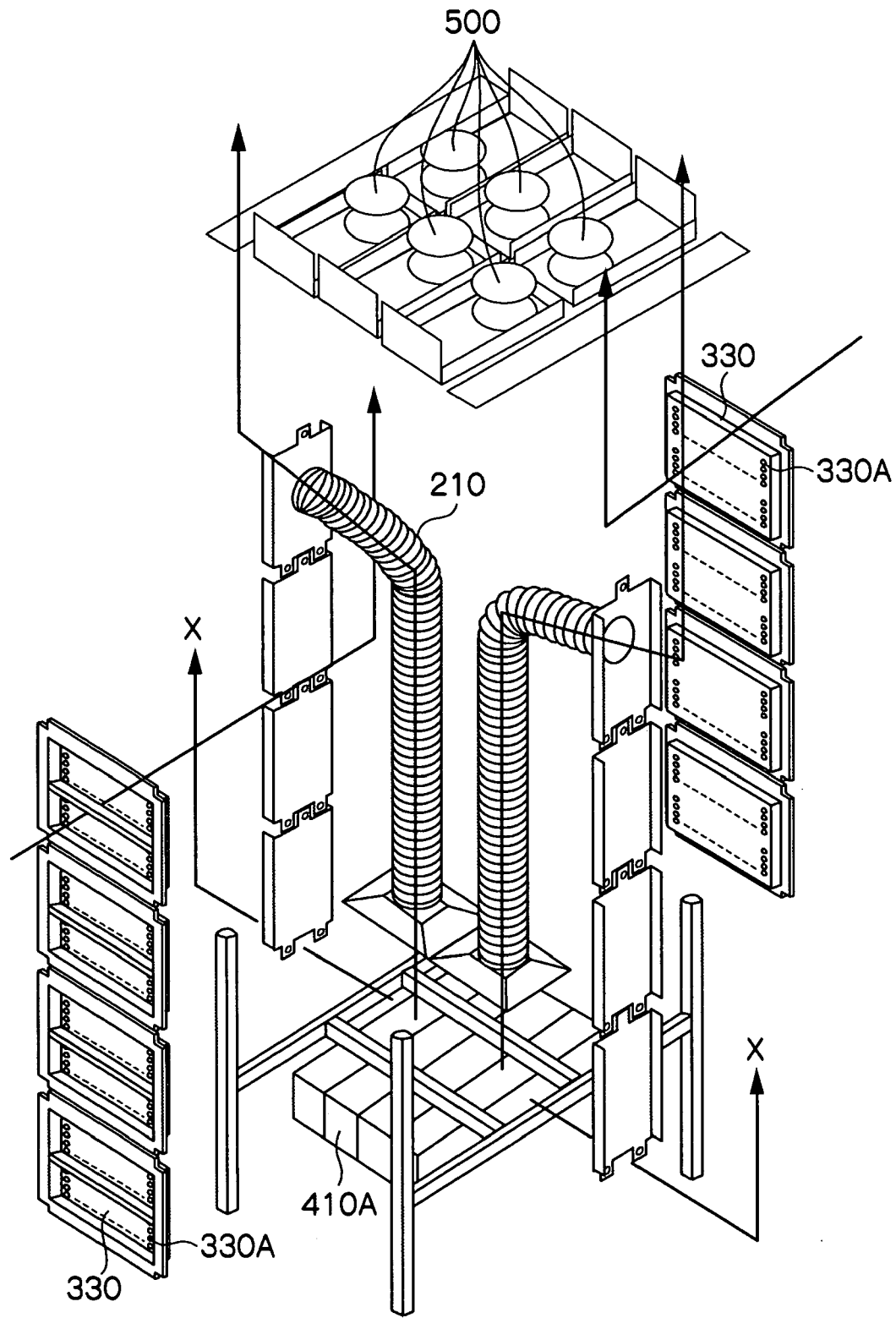
FIG. 4 is a diagram showing a variation of a partition member.

Incidentally, the external air path 210D provided to the side face of the partition member 210 for passing the external air through, as shown in FIG. 4, may be formed from a cylindrical shape or other shapes. Further, as shown in FIG. 4, the partition member 210 does not have to adopt a configuration of providing a concave portion to the bottom face of the partition member 210, and may adopt a configuration of using the fans 410 (not shown) provided to the upper part of the power supply unit 410A to introduce the external air into the external air path 210D provided to the side face of the partition member 210.

The configuration of the fans 500 installed at the upper part of the partition member 210 is now explained with reference to FIG. 5 and FIG. 6. A plurality of round fans 500 installed at the upper part of the partition member 210 are aligned and installed so as to face the cooling path, which is space inside the partition member 210, at the upper part of the partition member 210 installed between the HDD boxes 300. Thereupon, as shown in FIG. 6, the fans 500 are supported by the cabinet 200 so as to be inclined against the peripheral part of the HDD boxes 300 positioned immediately below the end of the cooling path that passes through the HDD boxes 300.

Figure 7:
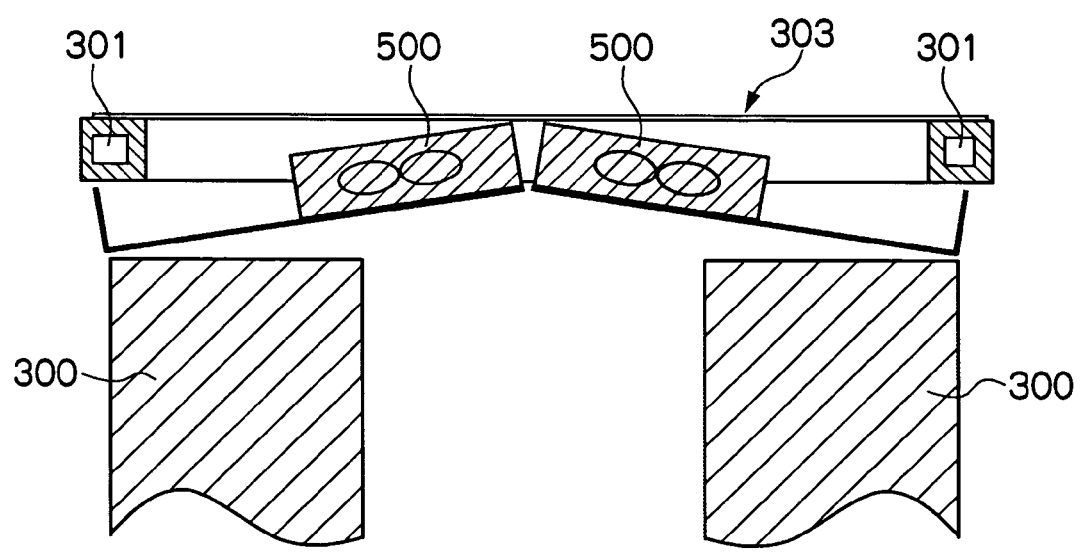
FIG. 7 is a diagram showing the configuration of the fans when installed at a slant.

The reason why the fans 500 can be installed at a slant inside the storage apparatus is because a one-inch corner pipe 301 for supporting the cabinet is installed between the fans provided at the upper part of the cabinet and the ceiling board at the upper end of the storage apparatus. Thereby, the space formed by the thickness of the corner pipe 301 will exist between the fans 500 and the ceiling board 303 of the cabinet, and it will be possible to use such space. As shown in FIG. 7, when giving consideration to the thickness of the corner pipe 301, the maximum angle of inclination between the upper end face of the HDD boxes 300 and the installation face of the fans 500 will be 6 degrees.

Figure 5:
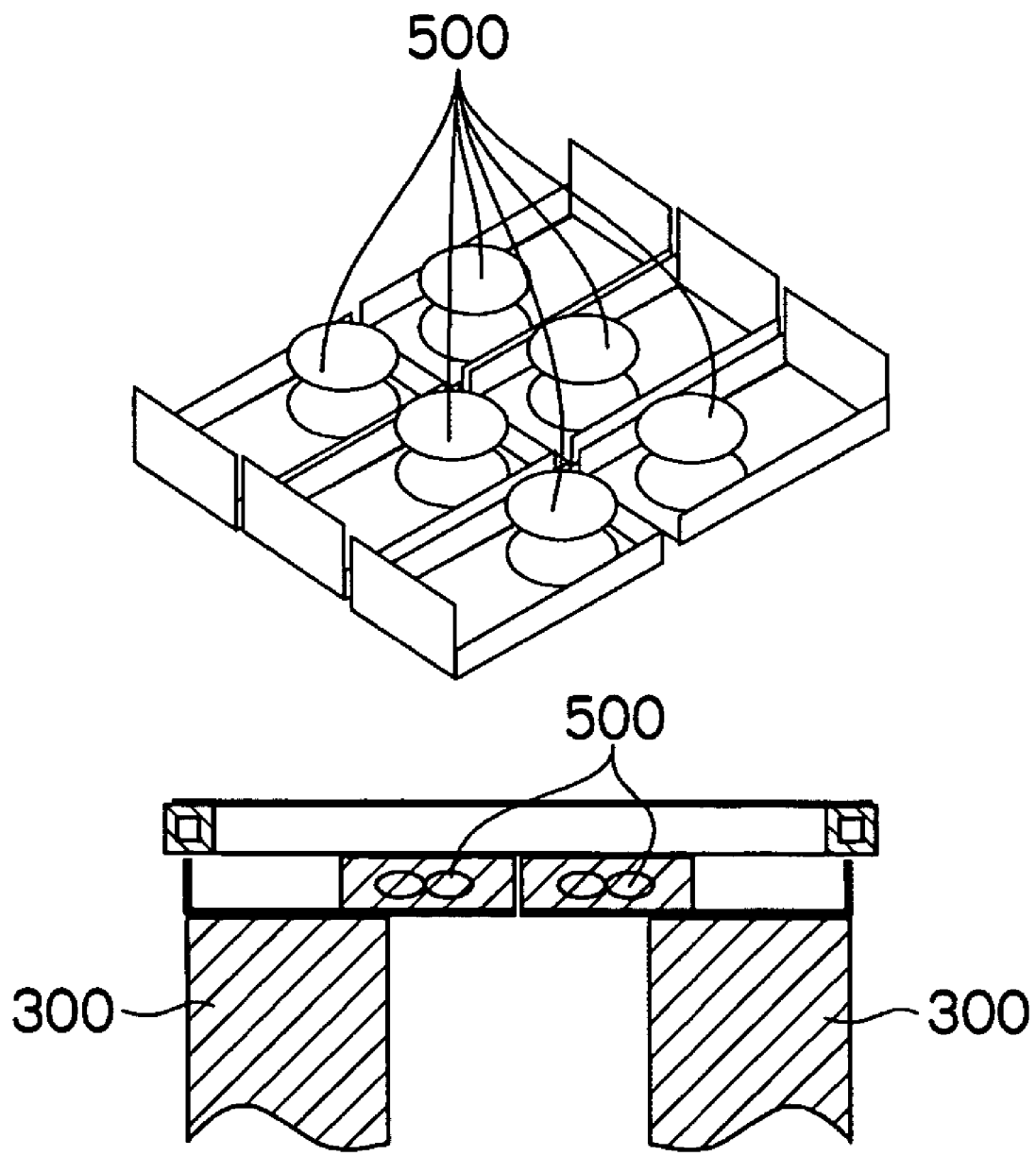
FIG. 5 is a diagram showing the configuration of the fans.
Figure 6:
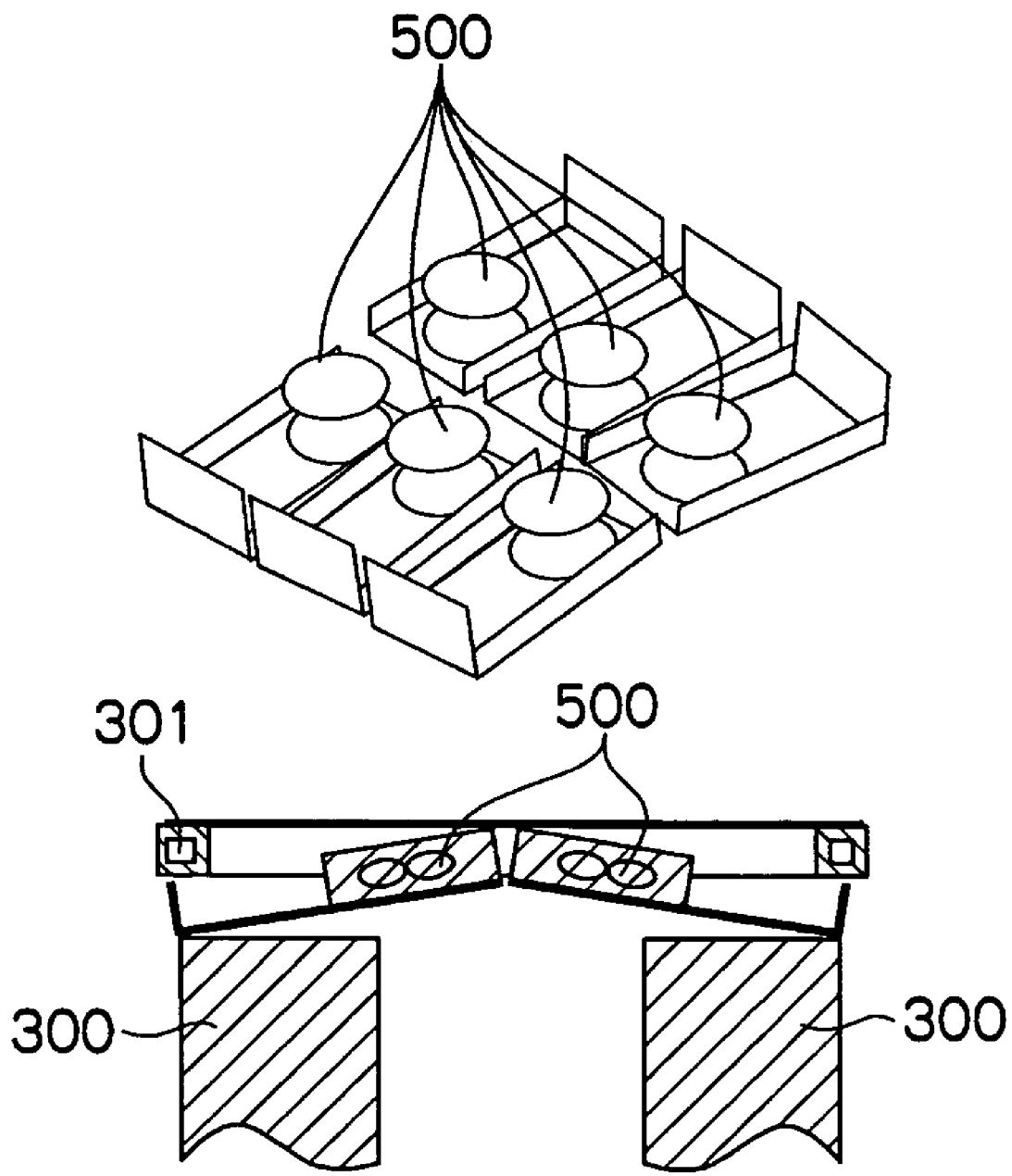
FIG. 6 is a diagram showing the configuration of the fans.

Conventionally, as shown in FIG. 5, the fans 500 were aligned and installed horizontally at the upper part of the partition member 210. Nevertheless, if the fans are installed as illustrated in FIG. 5, a so-called dead space, which is an area that does not face the cooling path among the fans 500, will arise, and it was not possible to utilize such dead space that is not facing the cooling path. As shown in FIG. 6, by installing the fans 500 at a slant against the upper end face of the memory medium housing unit, it is possible to secure space below the fans 500, and all faces of the fans 500 will face the cooling path. Thus, it will be possible to discharge the exhaust air while utilizing all faces of the fans 500, and the cooling efficiency will improve thereby. Further, since the resistance of wind will also decrease, the hissing sound of the fans 500 will decrease, and the noise will also decrease. Moreover, even if the fans 500 are installed at a slant, as described above, since the fans 500 will be housed in a space formed between the fans 500 and the ceiling board that is secured with the corner pipe 301, it is not necessary to change the dimension of the storage apparatus 100.

Figure 8:
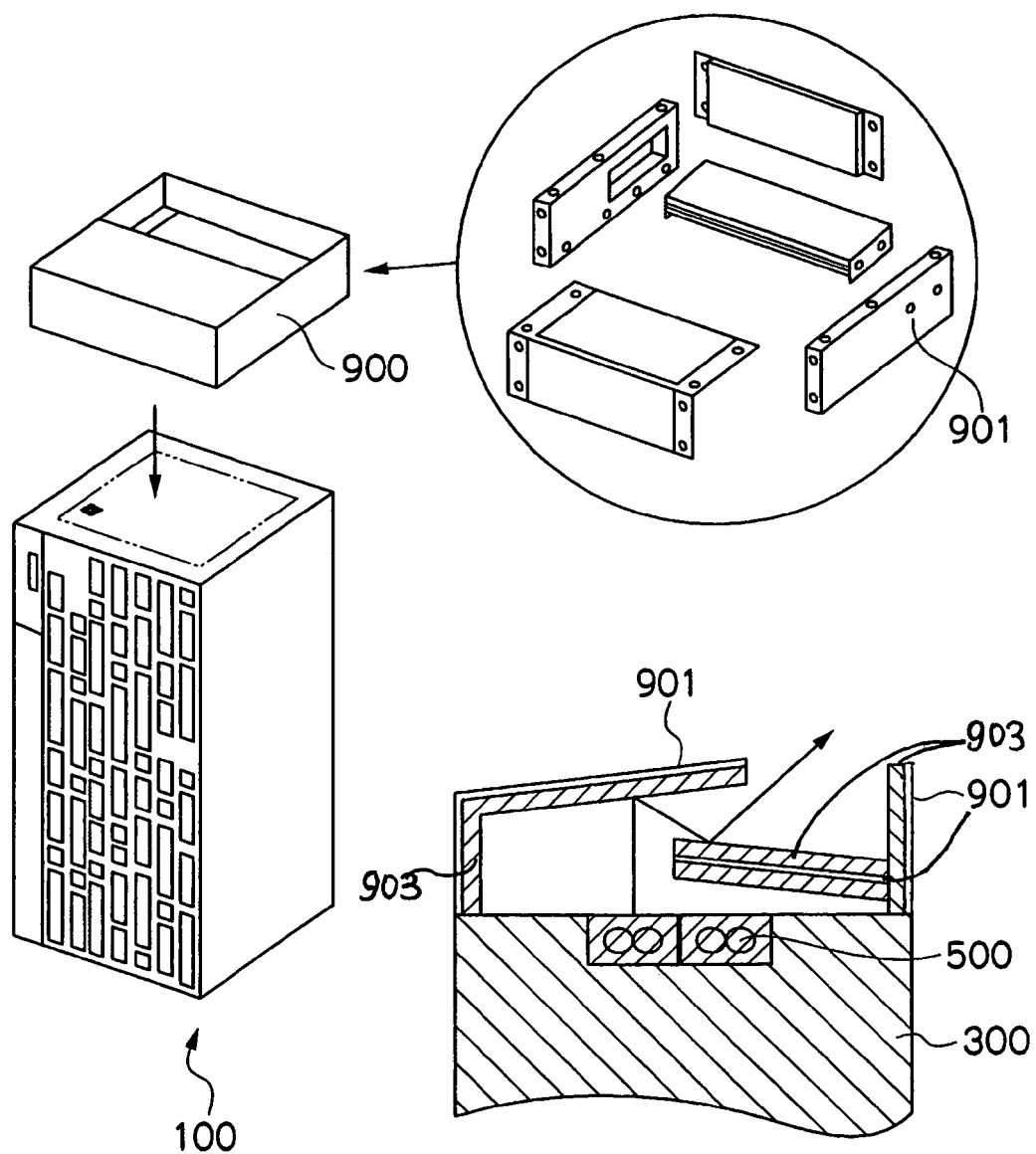
FIG. 8 is a diagram showing the configuration of a duct to be installed at the upper part of the storage apparatus.
Figure 9:
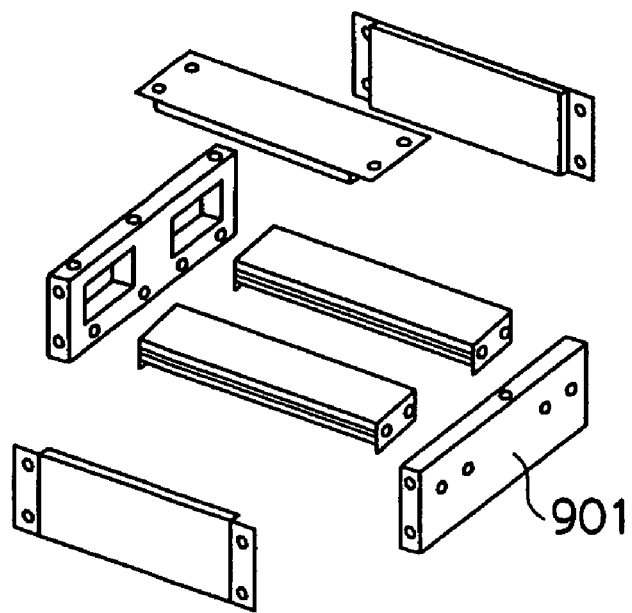
FIG. 9 is a diagram showing the configuration of the duct to be installed at the upper part of the storage apparatus.
Figure 9:
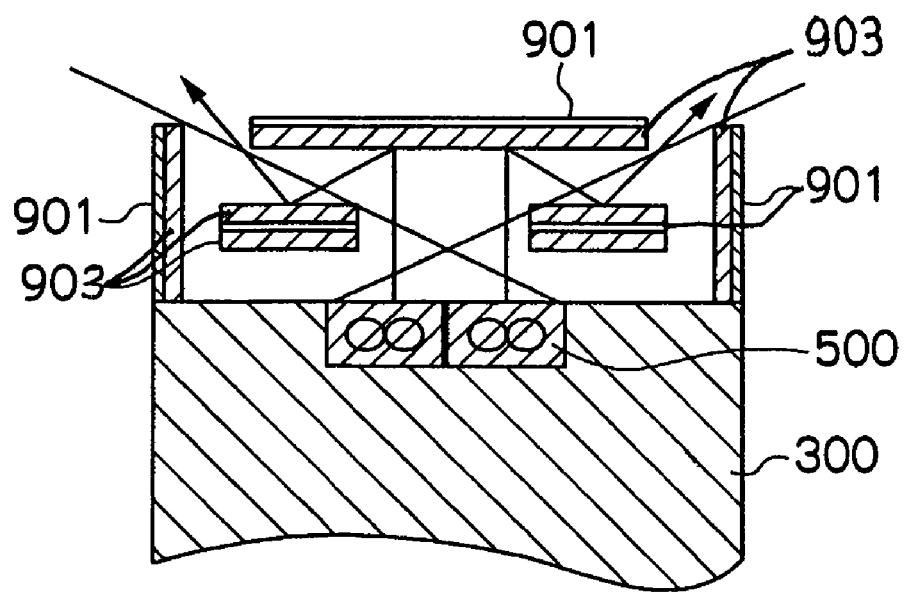

A duct 900 installed at the upper end of the storage apparatus 100 is now explained with reference to FIG. 8 and FIG. 9. The duct 900 is formed by combining a plurality of members 901 equipped with a cushioning material, and is installed at the upper end portion of the cabinet so as to cover the fans 500. In other words, the exhaust air from the fans 500 installed at the upper end of the storage apparatus 100 is blown against the member 901 equipped with the cushioning material, and the exhaust air is reflected to change the direction thereof so that it is discharged to a direction other than the ceiling. Specifically, for instance, as shown in FIG. 8 and FIG. 9, the member 901 equipped with the cushioning material is installed at the upper end of the storage apparatus 100 so as to surround the four sides; namely, the front face, back face and side faces at the upper end of the storage apparatus 100. In addition, a first member 901 equipped with a cushioning material is further provided to the member 901 equipped with the cushioning material so that the exhaust air from the fan 500 will be discharged thereto. A second member 901 equipped with a cushioning material is further provided so that the exhaust air blown against the member 901 equipped with the cushioning material will be discharged outside the storage apparatus 100. Moreover, the exhaust air is blown against the second member 901 equipped with the cushioning material so as to be discharged outside the storage apparatus 100. The exhaust air may be reflected and discharged into one or more directions.

All inner faces of the duct 900 are configured from the members 901 equipped with a cushioning material 903. The exhaust air from the fans 500 installed at the upper end of the cabinet 200 is blown against and reflected off the first and second members 901 equipped with the cushioning material, and discharged outside the storage apparatus 100 while reducing the noise. Thereupon, the exhaust air is made to hit the first member and second member 901 equipped with the cushioning material mounted inside the duct 900 at least once so as to reduce the noise.

For example, when using a member equipped with urethane foam as the cushioning material for reducing noise, it will be possible to absorb sound sources having a high frequency of 1000 Hz to 2000 Hz, and obtain a sound-absorbing effect of absorbing high-frequency sounds such as the hissing sound of fans. It is also possible to use a sound-absorbing material that is more expensive than the cushioning material as a replacement of such cushioning material. In such a case, the sound-absorbing material will be able to absorb low-frequency sounds in the range of 800 Hz to 900 Hz, which is the frequency of fan sounds. In addition, it is also possible to broaden the sound-absorbing area and mount a concavo-convex cushioning material capable of improving the sound absorbing efficiency in order to absorb sound sources of broader frequencies.

As a result of installing the duct 900 at the upper end of the cabinet 200, the reflected sound to the ceiling will decrease. Thus, noise generated from the storage apparatus can be reduced on the whole. Further, since the duct 900 having the foregoing configuration can freely change the direction of the exhaust air or the reflected direction of the exhaust air, it is possible to meet the customer needs and effectively reduce noise in the direction or location where customers wish to reduce such noise. Moreover, since the duct 900 can be removably installed at the upper part of the cabinet of the storage apparatus 100, it is possible to freely remove or reinstall such duct 900 when there is any change in the customer needs.

The embodiments of the present invention were described above to facilitate the understanding of the present invention, and are not intended to limit the interpretation of the present invention in any way. The present invention may be modified or improved without deviating from the gist thereof, and equivalents of the present invention are also included therein.

What is claimed is:

1. A storage apparatus having a cabinet for storing a plurality of memory mediums in an array, and a power supply unit for supplying power to a drive circuit of said memory mediums, wherein said power supply unit is housed inside a ground plane side of said cabinet, and said plurality of memory mediums are housed inside said cabinet on said power supply unit, said storage apparatus comprises:

a first cooling path to become a passage inside said cabinet of first external air for cooling said plurality of memory mediums, and which starts at inlets on a front side surface and back side surface of said cabinet, passes through said plurality of memory mediums and a first fan and ends at a top surface of said cabinet to discharge said first external air out of said cabinet from the top surface;

a second cooling path to become a passage inside said cabinet of second external air for cooling said power supply unit, and which starts at inlets on a front side surface and back side surface of said power supply unit, passes through said power supply unit, a second fan, a partition member, and to the sides of said first fan, ends at the top surface of said cabinet and discharges said second external air out of said cabinet at the top surface;

said first fan being provided immediately under the top surface of said cabinet and immediately above said memory mediums, said first fan drawing in said first external air via said inlets on said front side surface and back side surface of said cabinet to flow along said first cooling path and discharging said first external air that cooled said plurality of memory mediums outside said cabinet; and said partition member, which is provided on the internal left side and right side surfaces of said cabinet and configured to partition said first cooling path and said second cooling path so that said first external air and said second external air do not get mixed inside said cabinet;

wherein said first fan is supported by said cabinet so as to be slanted against a peripheral part of said memory mediums positioned immediately below said first fan.

2. The storage apparatus according to claim 1, wherein a duct for covering said fan is provided onto the upper end portion top surface of said cabinet, and said duct is configured so as to cushion operational noise generated from said fan.

3. The storage apparatus according to claim 2, wherein said duct is configured to be detachably mountable on said cabinet.

4. The storage apparatus according to claim 2, wherein said duct is configured to provide an exhaust air path for discharging the first and second external air that passed outside said cabinet, and is covered with a cushioning material for cushioning said operational noise laid down on said exhaust air path.

5. The storage apparatus according to claim 4, wherein, during the process of discharging the first and second external air that passed through said fan outside said cabinet via said exhaust air path, said duct reflects said first and second external air between a plurality of cushioning faces formed from said cushioning material.

6. The storage apparatus according to claim 5, wherein said duct is configured with four side plates, a top plate which is attached to one of the side plates, and an intermediate plate which is attached to another one of the side plates opposite to said one side plate and positioned between the top plate and the top surface of the cabinet, and both of the top plate and the intermediate plate slant against the top surface of the cabinet.

7. The storage apparatus according to claim 5, wherein said duct is configured with four side plates, a top plate which is attached to a pair of the side plates, and two intermediate plates each of which is attached to the pair of the side plates and positioned between the top plate and the top surface of the cabinet, and both of the top plate and the immediate plate are parallel to the top surface of the cabinet.

8. The storage apparatus according to claim 1, wherein said fan discharges said second external air that cooled said power supply unit outside said cabinet.

9. The storage apparatus according to claim 1, wherein said plurality of memory mediums are respectively positioned on a front face side and a back face side of said partition member, and said first external air is introduced into said first cooling path between said front face side and back face side via openings of said front face side and back face side.

10. The storage apparatus according to claim 1, wherein the partition member has a bottom face, left and right side faces, a frame, and resistive plates fixed to the frame to provide a rectangular-shaped structure.

11. The storage apparatus according to claim 10, wherein the bottom face of the partition member includes a pair of inclined surfaces toward a center of the partition member, the pair of inclined surfaces are connected via a ridge line to provide a semi-triangular pyramid-shaped concave portion, and each of said inclined surfaces is formed with a front face edge and a back face edge.

12. The storage apparatus according to claim 1, wherein the partition member includes a bottom plate and two generally L-shaped tubes supported on the bottom plate

* * * * *